United States Patent [19]
Caughlin et al.

[11] 3,909,222
[45] Sept. 30, 1975

[54] WASTE COLLECTION APPARATUS

[76] Inventors: James Daniel Caughlin, 6643 Muirlands Dr., La Jolla, Calif. 92037; John D. Bell, 2738 Point Dr., Monroe, La. 71201

[22] Filed: Dec. 12, 1973

[21] Appl. No.: 424,180

[52] U.S. Cl. ............... 55/317; 55/290; 55/332; 55/354; 55/417; 55/430; 55/432; 55/465; 55/467; 209/31; 209/143; 23/259.1
[51] Int. Cl.² ........................................ B01D 50/00
[58] Field of Search ............ 55/290, 317, 318, 319, 55/320, 321, 328, 331, 332, 351, 383, 400, 55/413, 414, 415, 354, 417, 423, 426, 427, 428, 55/429, 430, 438, 439, 462, 465, 466, 476, 315, 55/467, 434, DIG. 25, 257, 259, 432; 302/1, 11, 302/12, 13; 209/30, 31, 32, 33, 34, 35, 143, 135, 209/136; 23/259.1; 71/64 G

[56] References Cited
UNITED STATES PATENTS

| | | | |
|---|---|---|---|
| 159,505 | 2/1875 | Fender | 55/34 |
| 657,998 | 9/1900 | Williams | 209/143 |
| 2,125,574 | 8/1938 | Knight et al. | 55/351 X |
| 2,313,956 | 3/1943 | McGrane | 55/315 |
| 3,140,921 | 7/1964 | Barrow, Jr. | 71/64.6 |
| 3,246,958 | 9/1963 | Bowes | 55/417 X |
| 3,360,125 | 12/1967 | Horsey | 209/143 X |
| 3,384,233 | 5/1968 | Bolles | 209/137 X |
| 3,628,313 | 12/1971 | Broadbent | 55/400 X |

FOREIGN PATENTS OR APPLICATIONS

| 1,190,306 | 4/1965 | Germany | 55/434 |
|---|---|---|---|

*Primary Examiner*—Frank W. Lutter
*Assistant Examiner*—David L. Lacey
*Attorney, Agent, or Firm*—Brown & Martin

[57] ABSTRACT

Apparatus for collecting waste material, such as dirt and trash from a cotton gin or similar source, and compacting the material to prevent atmospheric pollution. An air stream carrying the waste material is injected into a separation chamber, which contains deflection means to deflect the larger waste particles to a compacting screw conveyor. The air, and suspended fine particles, are extracted from the chamber by a blower, which reduces back pressure in the chamber and minimizes power requirements. The fine particles are collected in a condenser and added to the other compacted material for disposal or other use.

1 Claim, 6 Drawing Figures

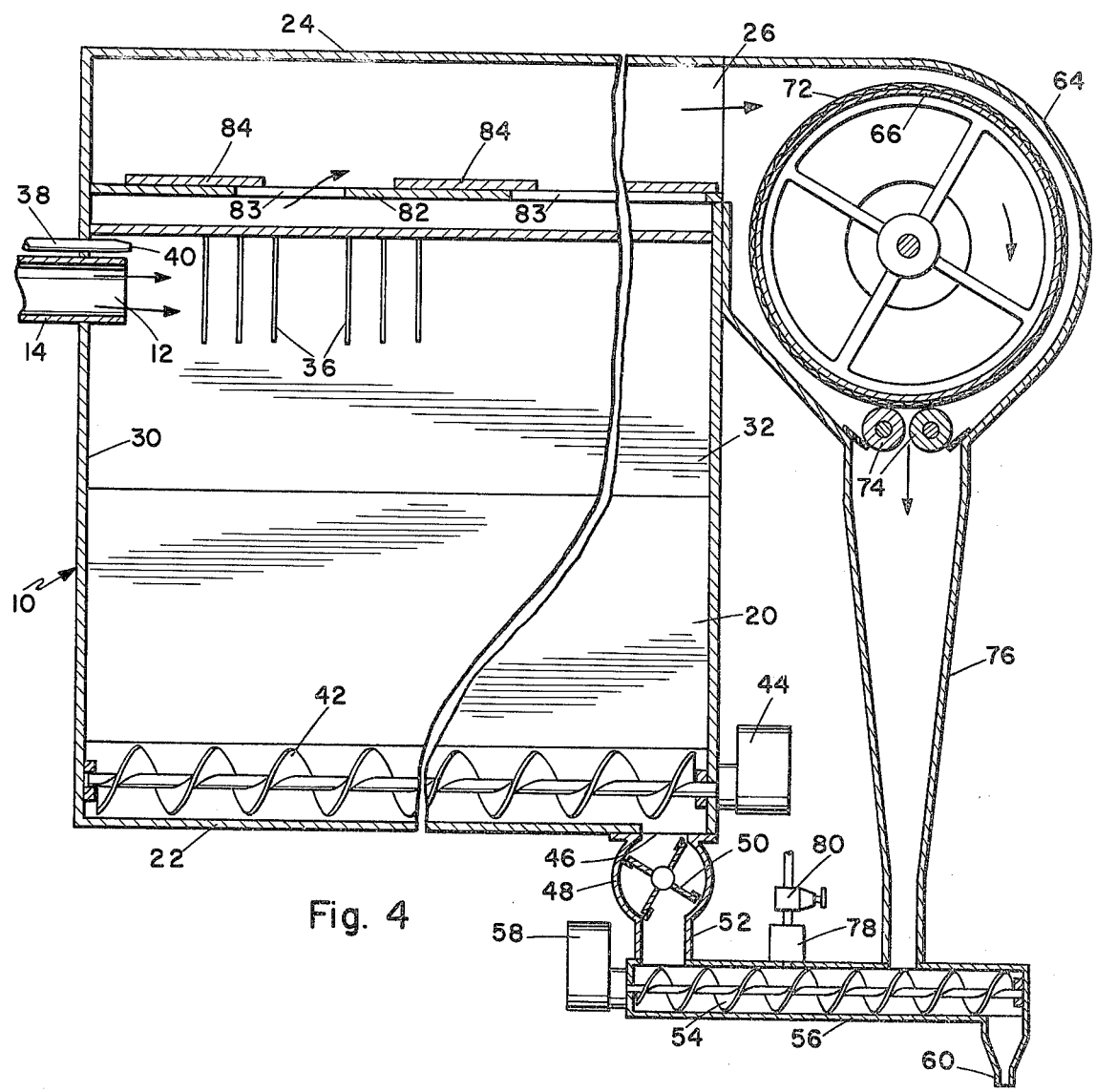
Fig. 4
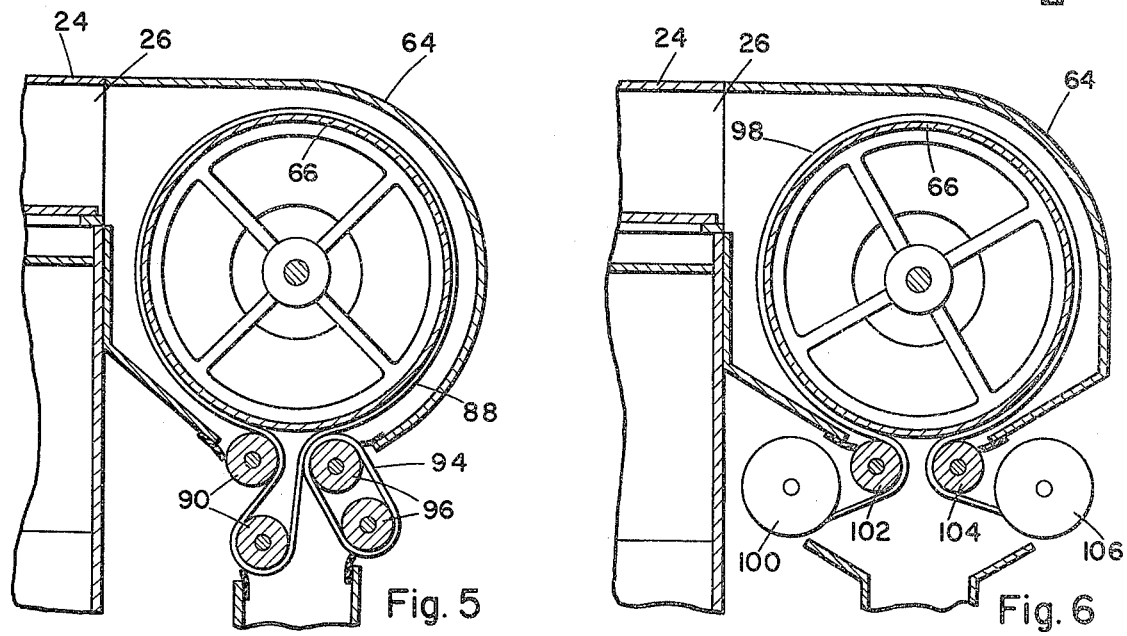
Fig. 5                                  Fig. 6

WASTE COLLECTION APPARATUS

BACKGROUND OF THE INVENTION

In the collection of waste from certain industrial processes, it is common to use cyclone type separators, which require considerable power for their operation due to the high pressures involved. Such apparatus is noisy and is not particularly efficient in removing fine particles, which escape in the air exhaust and cause atmospheric pollution. In the cotton ginning process, as an example, dirt and trash is removed from the cotton together with a certain amount of fine lint and dust. Collection and disposal of the waste material has long been a problem and is expensive.

SUMMARY OF THE INVENTION

The apparatus described herein is capable of separating all waste material from a particular source, including very fine particulate matter, and processing the waste into a form which can be readily disposed of or re-used in a useful manner. Waste material is picked up in an air stream by a blower or vacuum source and is injected into a separation chamber. Deflector or baffle means deflect the large particles into a compacting screw conveyor. Air is withdrawn from the chamber by a blower, carrying the fine particulate matter in suspension. The fine particles are collected in a condenser and added to the other compacted matter in a second screw conveyor. Water or chemicals can be added to the compacted material to produce a useable fertilizer or other useful product.

The separation chamber operates at a low pressure, due to the use of a blower to extract the air. This results in a considerable reduction in power needed to drive the apparatus, and noise is also minimized since the blower is the only high speed moving element. The exhaust from the apparatus is clean air at substantially ambient temperature.

The primary object of this invention, therefore, is to provide new and improved waste collection apparatus.

Another object of this invention is to provide a new and improved waste collection apparatus which produces an exhaust of clean air and compacts all of the waste into a readily disposable or useful product.

Another object of this invention is to provide a new and improved waste collection apparatus which requires a minimum of power for operation.

A further object of this invention is to provide a new and improved waste collection apparatus which is adaptable to various industrial processes producing both coarse and fine particulate waste material.

Other objects and many advantages of this invention will become more apparent upon a reading of the following detailed description and an examination of the drawings wherein like reference numerals designate like parts throughout and in which:

FIG. 4 is a sectional view taken on line 4—4 of FIG. 2.

FIG. 5 is a view similar to a portion of FIG. 4, showing an alternative condenser configuration.

FIG. 6 is a further similar view of another condenser configuration.

DESCRIPTION OF THE PREFERRED EMBODIMENT

Figure 1:
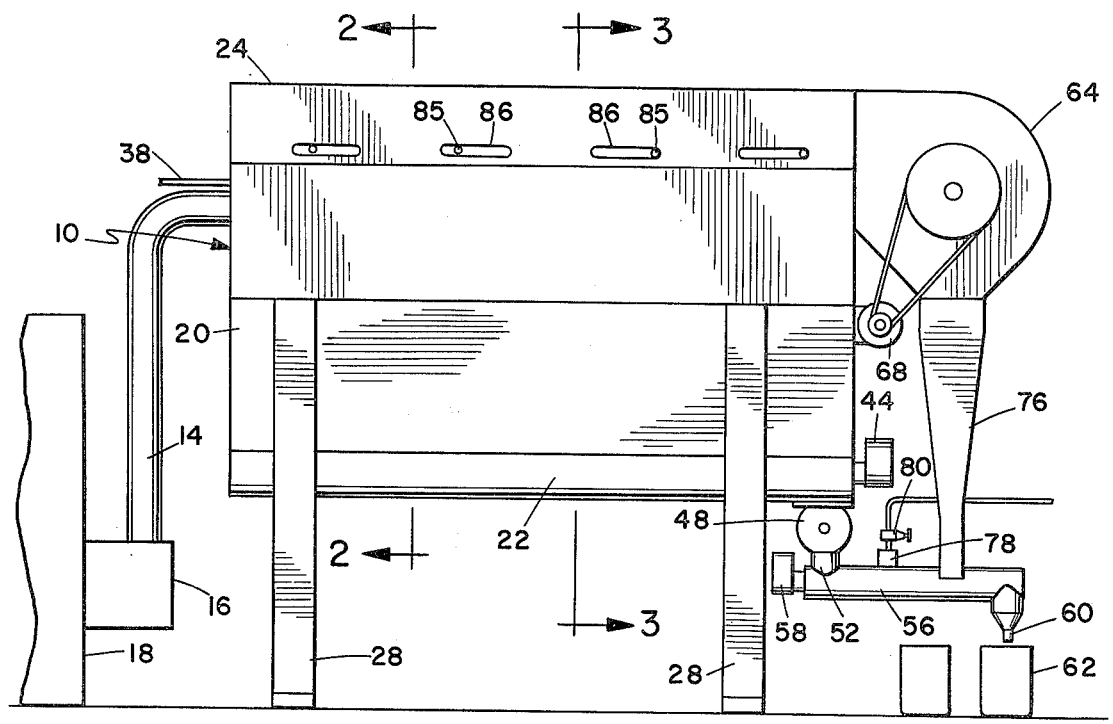
FIG. 1 is a side elevation view of the complete apparatus.
Figure 2:
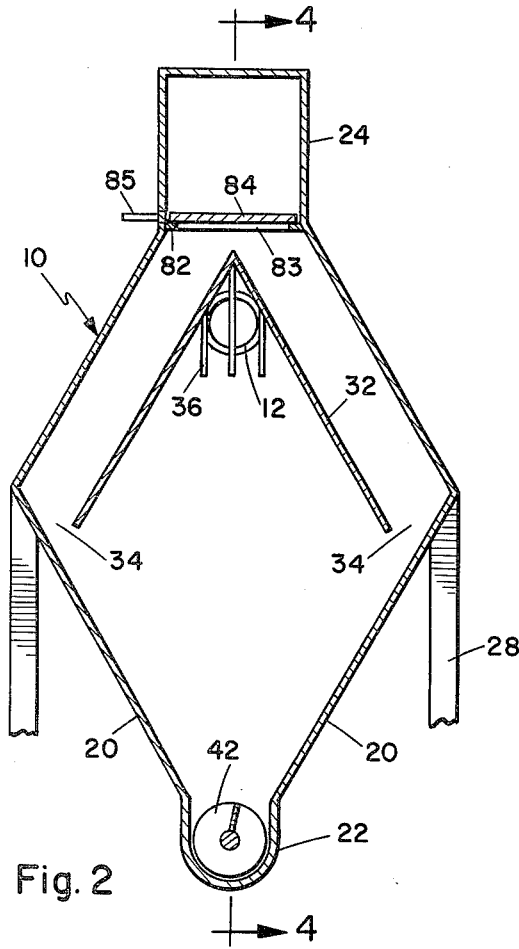
FIG. 2 is an enlarged sectional view taken on line 2—2 of FIG. 1.
Figure 3:
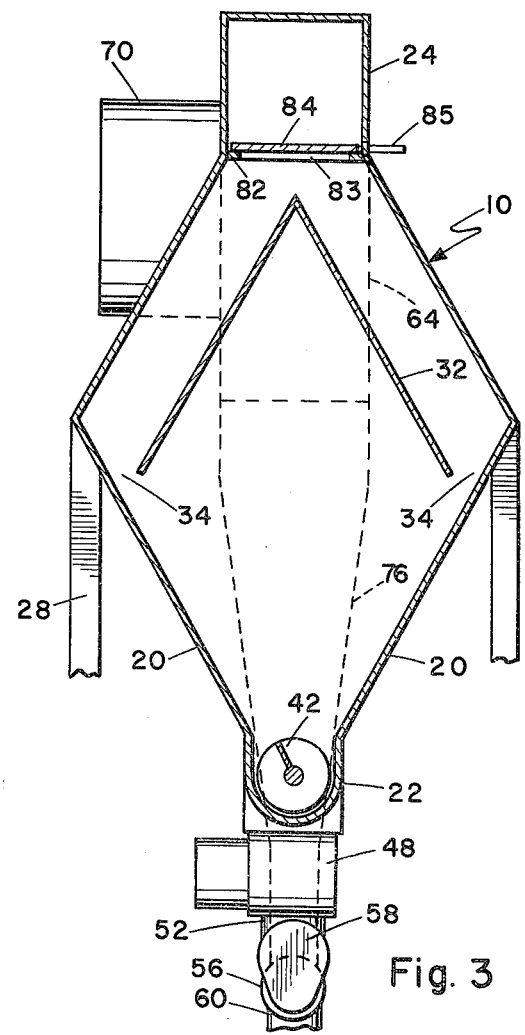
FIG. 3 is an enlarged sectional view taken on line 3—3 of FIG. 1.

The apparatus includes a separation chamber 10 with an air inlet 12 at one end, the air inlet being connected by a supply pipe 14 to a blower 16. The blower acts as a vacuum pick up to extract waste material from a cotton gin 18, or similar source. Chamber 10 is a closed box structure having inclined side walls 20 converging downwardly to a trough 22 extending longitudinally along the bottom of the chamber. At the top of the chamber is a longitudinal manifold 24 leading to an air outlet 26 at the end opposite the inlet. The chamber is mounted on any suitable supports 28, depending on the specific installation.

Air inlet 12 enters the separation chamber 10 through end wall 30 in the upper portion of the chamber, below manifold 24 and under the apex of an inverted V-shaped deflector 32. The deflector extends the full length of the chamber, the lower edges of the inclined deflection sides being spaced from side walls 20 to leave longitudinal slots 34. Hanging from the upper portion of the deflector 32, in front of inlet 12, are groups of scatter bars 36 to break up the incoming stream of material. For some types of material it may be desirable to spray the incoming material with water. This is best accomplished by injecting water through a supply tube 38 to a nozzle 40, immediately above inlet 12.

Mounted longitudinally in trough 22 is a helical screw conveyor 42 driven by a suitable motor 44. At the outlet end of the chamber the trough has an outlet opening 46 leading to a vacuum box 48 of well known type. The vacuum box contains a multiple bladed rotor 50 which passes compacted material without allowing escape of air. The essentially air free material passes through a chute 52 to a second helical screw conveyor 54 in a cylindrical barrel 56, driven by a motor 58. Barrel 56 has a delivery outlet 60 through which the finally compacted material is ejected, for collection in suitable containers 62, as in FIG. 1.

Mounted on chamber 10 at the air outlet 26 is a condenser 64 containing a rotatable drum 66 driven by a motor 68. The structure and operation of this type of condenser is well known in cotton processing operations. Drum 66 is porous or perforated to admit air to the interior, and at one end of the condenser is a blower 70 to draw air through the drum. Wrapped around the drum is a belt 72 of woven or fibrous material, which will trap and hold fine particles of material from the air drawn through the condenser. Below the drum are pick-off rolls 74 which remove the particulate material and drop it into a chute 76. The chute is coupled to barrel 56 to add the fine particulate material to the compacted coarse material in conveyor 54.

If the waste material is of a type which can be used as fertilizer, or otherwise put to good use, it may be desirable to add water or some type of chemical to the material. For this purpose the barrel 56 is provided with an additive inlet 78, with a valve 80 to control the inlet flow.

Blower 70 pulls air from the separation chamber 10 and reduces the pressure in the chamber, so that the supply blower 16 need not be unduly powerful. The air is drawn up through slots 34, carrying the fine particles which are not heavy enough to drop into conveyor 42. To balance the outward air flow to the incoming supply, manifold 24 is provided with a baffle plate 82 having openings 83, which are controlled by slide valves 84. Each slide valve has an arm 85 projecting outwardly through a slot 86, so that the valves can be adjusted to vary the effective air outlet.

For some purposes it may be desirable to use the condenser belt arrangement of FIG. 5. An endless belt 88 is brought clear of drum 66 around a pair of guide rollers 90, and a short retaining belt 94 around rollers 96 holds the main belt 88 against the drum. This configuration is suitable for use with materials which are not readily removed from the belt.

A further configuration, illustrated in FIG. 6, is adapted for use in collecting very fine particulate material which tends to clog the condenser belt. A belt 98 is fed from a supply reel 100, around a guide roller 102, around drum 66 and a further guide roller 104 to a take-up reel 106. This belt can be removed after use and either cleaned or disposed of.

The apparatus is used in conjunction with a cotton gin or similar processing equipment which produces waste. All of the waste is efficiently collected with a minimum of power and compacted to a readily handled form. The air exhausted in the final stage of the apparatus, from blower 70, is clean and free of atmospheric pollution. In use with a cotton gin, and in certain other uses, the compacted waste material can be put to use at a profit, where previously it was disposed of at considerable cost and inconveniece.

We claim:
1. Waste collection apparatus, comprising:
an elongated separation chamber having an upper portion with an inlet at one end for connection to a source of waste material;
the other end of said upper portion having an air outlet;
said chamber having a lower portion with downwardly converging side walls;
a trough extending longitudinally along and connected to the lower end of said side walls;
a compacting conveyor mounted in said trough and having an outlet opening at one end;
an inverted V-shaped deflector fixed in the upper portion of said chamber with the apex thereof extending longitudinally for the full length of the chamber, with said inlet opening immediately below the apex of the deflector;
scatter bars fixed to the apex portion of said deflector and extending downwardly in said V-shaped deflector immediately adjacent said inlet in the path of incoming waste material in the upper portion of the deflector;
the lower edges of said deflector extending a substantial distance below said inlet opening and being closely spaced from the lower portion of said side walls and defining longitudinal slots therebetween, whereby the large particulate contained in the waste material is caused to drop into said trough;
blower means coupled to said outlet for extracting air from said chamber;
condenser means between said air outlet and said blower for separating fine particulate matter from air extracted from the chamber;
and said upper portion has a manifold extending substantially the full length of the chamber above said deflector and leading to said air outlet.

* * * * *